(12) United States Patent
DeLuca et al.

(10) Patent No.: US 9,083,558 B2
(45) Date of Patent: Jul. 14, 2015

(54) CONTROL E-MAIL DOWNLOAD THROUGH INSTRUCTIONAL REQUESTS

(75) Inventors: Lisa Seacat DeLuca, San Francisco, CA (US); Pamela A. Nesbitt, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/647,769

(22) Filed: Dec. 28, 2009

(65) Prior Publication Data

US 2011/0161426 A1 Jun. 30, 2011

(51) Int. Cl.
*G06F 15/16* (2006.01)
*H04L 12/58* (2006.01)
*G06Q 10/10* (2012.01)

(52) U.S. Cl.
CPC .......... *H04L 12/5855* (2013.01); *G06Q 10/107* (2013.01); *H04L 51/14* (2013.01)

(58) Field of Classification Search
USPC ................................................. 709/206–207
See application file for complete search history.

(56) References Cited

U.S. PATENT DOCUMENTS

| | | | | |
|---|---|---|---|---|
| 5,761,603 | A * | 6/1998 | Nojima et al. ................ | 725/131 |
| 6,088,720 | A | 7/2000 | Berkowitz et al. | |
| 6,377,978 | B1 * | 4/2002 | Nguyen ........................ | 709/206 |
| 6,934,738 | B1 | 8/2005 | Furusawa et al. | |
| 7,013,330 | B1 * | 3/2006 | Tarbotton et al. ............ | 709/219 |
| 7,269,626 | B1 * | 9/2007 | Nguyen ........................ | 709/206 |
| 7,290,034 | B2 * | 10/2007 | Budd et al. ................... | 709/206 |
| 7,305,437 | B2 | 12/2007 | Horvitz et al. | |
| 7,536,440 | B2 * | 5/2009 | Budd et al. ................... | 709/206 |
| 8,510,393 | B2 | 8/2013 | Childress et al. | |
| 2002/0087646 | A1 | 7/2002 | Hickey et al. | |
| 2002/0120698 | A1 * | 8/2002 | Tamargo ....................... | 709/206 |
| 2003/0163538 | A1 | 8/2003 | Yeh et al. | |
| 2004/0034691 | A1 * | 2/2004 | Tanimoto ...................... | 709/206 |
| 2004/0059791 | A1 * | 3/2004 | Sherman et al. ............. | 709/207 |
| 2004/0254998 | A1 | 12/2004 | Horvitz | |
| 2005/0021485 | A1 | 1/2005 | Nodelman et al. | |
| 2005/0076087 | A1 * | 4/2005 | Budd et al. ................... | 709/206 |
| 2005/0152378 | A1 * | 7/2005 | Bango et al. ................. | 370/400 |
| 2005/0204008 | A1 * | 9/2005 | Shinbrood .................... | 709/206 |
| 2007/0124390 | A1 * | 5/2007 | Sivakumar et al. .......... | 709/206 |
| 2007/0130265 | A1 * | 6/2007 | Yano et al. ................... | 709/206 |
| 2007/0190978 | A1 * | 8/2007 | White et al. ................ | 455/412.1 |
| 2007/0244974 | A1 | 10/2007 | Chasin | |
| 2008/0016575 | A1 | 1/2008 | Vincent et al. | |
| 2008/0074240 | A1 | 3/2008 | Jones et al. | |
| 2008/0104175 | A1 | 5/2008 | Keohane et al. | |

(Continued)

OTHER PUBLICATIONS

Office Action, dated Sep. 19, 2011, regarding U.S. Appl. No. 12/643,485, 14 pages.

(Continued)

*Primary Examiner* — Saket K Daftuar

(74) *Attorney, Agent, or Firm* — Yee & Associates, P.C.; Jeffrey S. LaBaw

(57) ABSTRACT

Method, system and computer program product for requesting e-mail messages. Download instructions for sending e-mail messages from an e-mail message database storing a plurality of e-mail messages to an e-mail client are received at an e-mail messaging system, the plurality of e-mail messages having accumulated due to inattention by a user. The e-mail messaging system sends e-mail messages from the e-mail message database to the e-mail client in accordance with the download instructions.

2 Claims, 7 Drawing Sheets

(56) References Cited

U.S. PATENT DOCUMENTS

| | | | |
|---|---|---|---|
| 2008/0112558 A1* | 5/2008 | Mendiola | 379/265.09 |
| 2008/0126951 A1* | 5/2008 | Sood et al. | 715/752 |
| 2008/0137587 A1* | 6/2008 | Matsukura et al. | 370/315 |
| 2008/0172663 A1* | 7/2008 | Lee | 717/173 |
| 2008/0210476 A1* | 9/2008 | Silverbrook et al. | 178/19.05 |
| 2009/0037359 A1 | 2/2009 | Callanan et al. | |
| 2009/0158441 A1 | 6/2009 | Mohler et al. | |
| 2010/0023594 A1* | 1/2010 | Kamiwada et al. | 709/207 |
| 2010/0064231 A1* | 3/2010 | Gupta | 715/748 |
| 2010/0131386 A1* | 5/2010 | Shiely et al. | 705/26 |
| 2010/0135287 A1* | 6/2010 | Hosain et al. | 370/389 |
| 2010/0142452 A1* | 6/2010 | Mariniello | 370/329 |
| 2010/0169264 A1 | 7/2010 | O'Sullivan et al. | |
| 2010/0202307 A1* | 8/2010 | Lee et al. | 370/252 |
| 2010/0211644 A1* | 8/2010 | Lavoie et al. | 709/206 |
| 2010/0287249 A1 | 11/2010 | Yigang et al. | |
| 2011/0111778 A1* | 5/2011 | Son et al. | 455/466 |
| 2011/0153753 A1 | 6/2011 | Childress et al. | |

OTHER PUBLICATIONS

Final Office Action, dated Mar. 2, 2012, regarding U.S. Appl. No. 12/643,485, 18 pages.

Final Office Action, dated Sep. 21, 2012, regarding U.S. Appl. No. 12/643,485, 19 pages.

Notice of Allowance, dated Apr. 9, 2013, regarding U.S. Appl. No. 12/643,485, 6 pages.

Toney et al., "Social weight: designing to minimise the social consequences arising from technology use by the mobile professional", Springer-Verlag London Limited 2003, Pers Ubiqui Comput (2003) 7: 309-320.

Cataldo et al., "Identification of Coordination Requirements: Implications for the Design of Collaboration and Awareness Tools", ACM Digital Library, pp. 353-362 http://www.casos.cs.cmu.edu/awards/papers/cscw06_publish_final.pdf, Nov. 4, 2006.

* cited by examiner

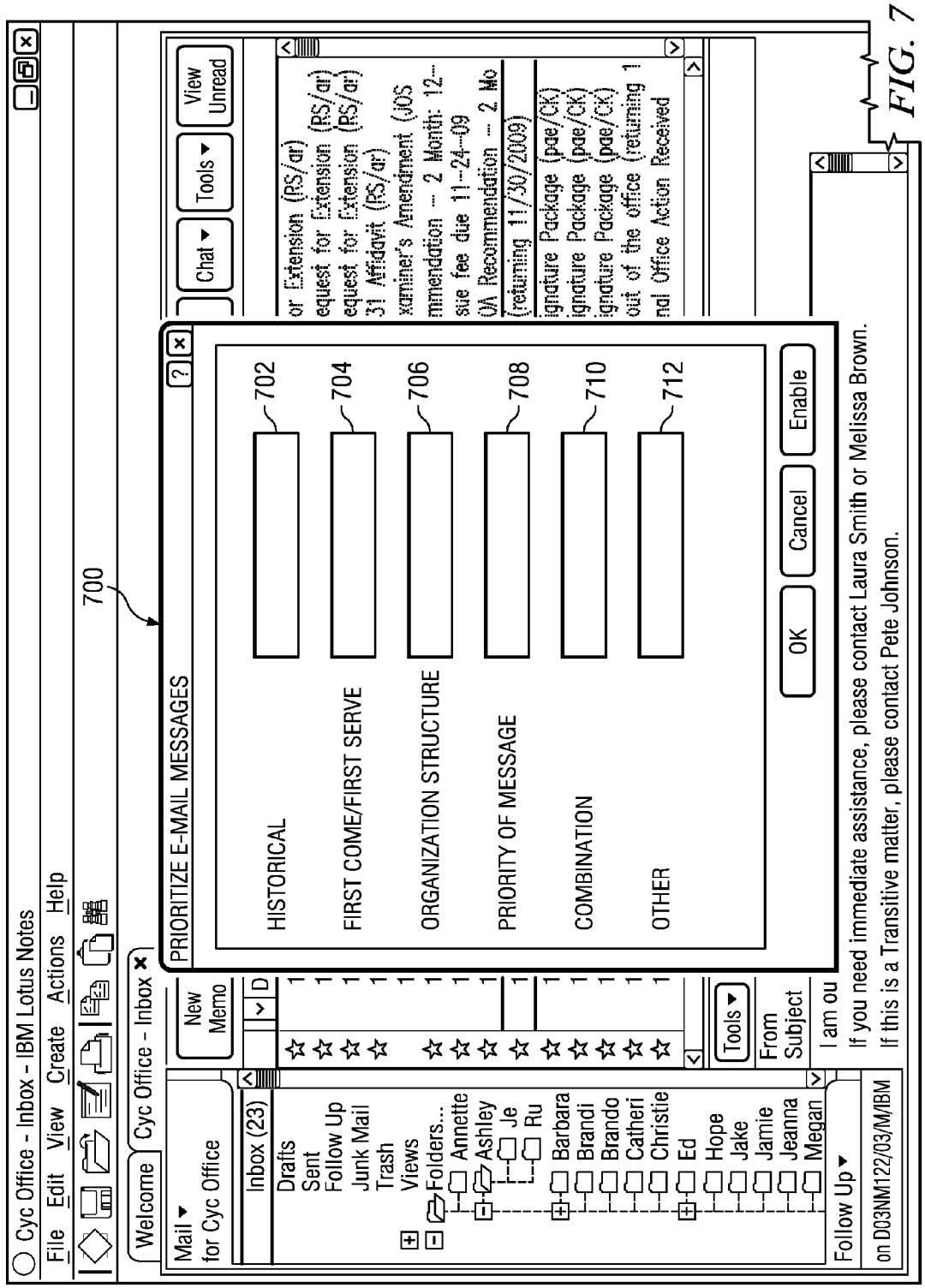

CONTROL E-MAIL DOWNLOAD THROUGH INSTRUCTIONAL REQUESTS

BACKGROUND

1. Field

The disclosure relates generally to an electronic mail (e-mail) messaging system and more specifically to a method, apparatus and computer program product for requesting e-mail messages from an e-mail message database of an e-mail messaging system.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to other users through the Internet.

The use of e-mail messages is commonplace for both personal and business use. E-mail messages are used by individuals to keep in touch with and communicate with other users. Additionally, e-mail messages provide a medium to collaborate and exchange documents.

Inattention to an e-mail account by a user for a period of time may result in the accumulation of a large number of unread e-mail messages for the user. For example, an extended absence from work due to a vacation or for another reason, or a lack of access to an e-mail account for a period of time for any reason, may result in the accumulation of hundreds or even thousands of unopened e-mail messages. When the user returns to work or otherwise becomes able to access his/her e-mail account, opening and reading each of the accumulated e-mail messages may place a significant burden on the user. Also, the large number of e-mail messages might result in a delay in reading time-sensitive e-mail messages that may have been received during the user's absence or may result in the user "skimming" through the accumulated e-mail messages and, perhaps, missing important e-mail messages that may have been received.

SUMMARY

According to one illustrative embodiment, a method is provided for requesting e-mail messages. Download instructions for sending e-mail messages from an e-mail message database storing a plurality of e-mail messages to an e-mail client are received at an e-mail messaging system, the plurality of e-mail messages having accumulated due to inattention by a user. The e-mail messaging system sends e-mail messages from the e-mail message database to the e-mail client in accordance with the download instructions.

BRIEF DESCRIPTION OF THE SEVERAL VIEWS OF THE DRAWINGS

FIG. 7 is an illustration of a "prioritize e-mail messages" dialog box in accordance with an illustrative embodiment.

DETAILED DESCRIPTION

Figure 1:
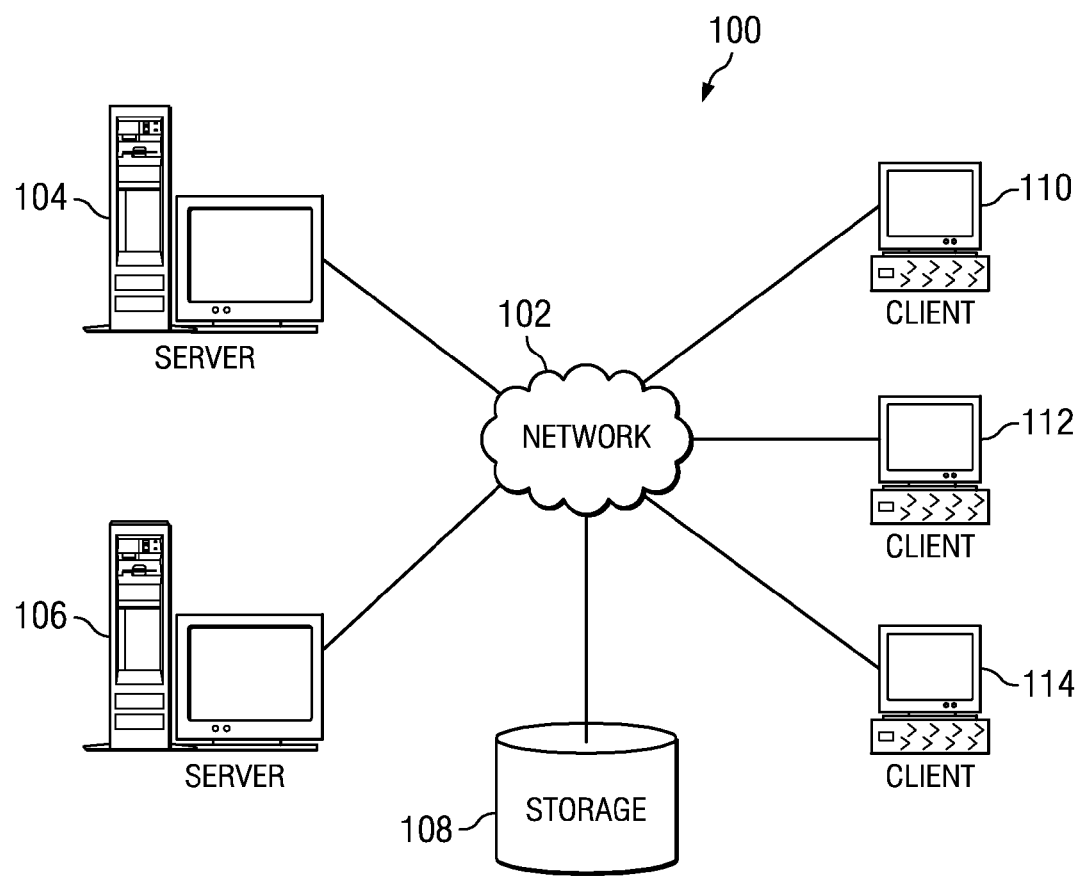
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
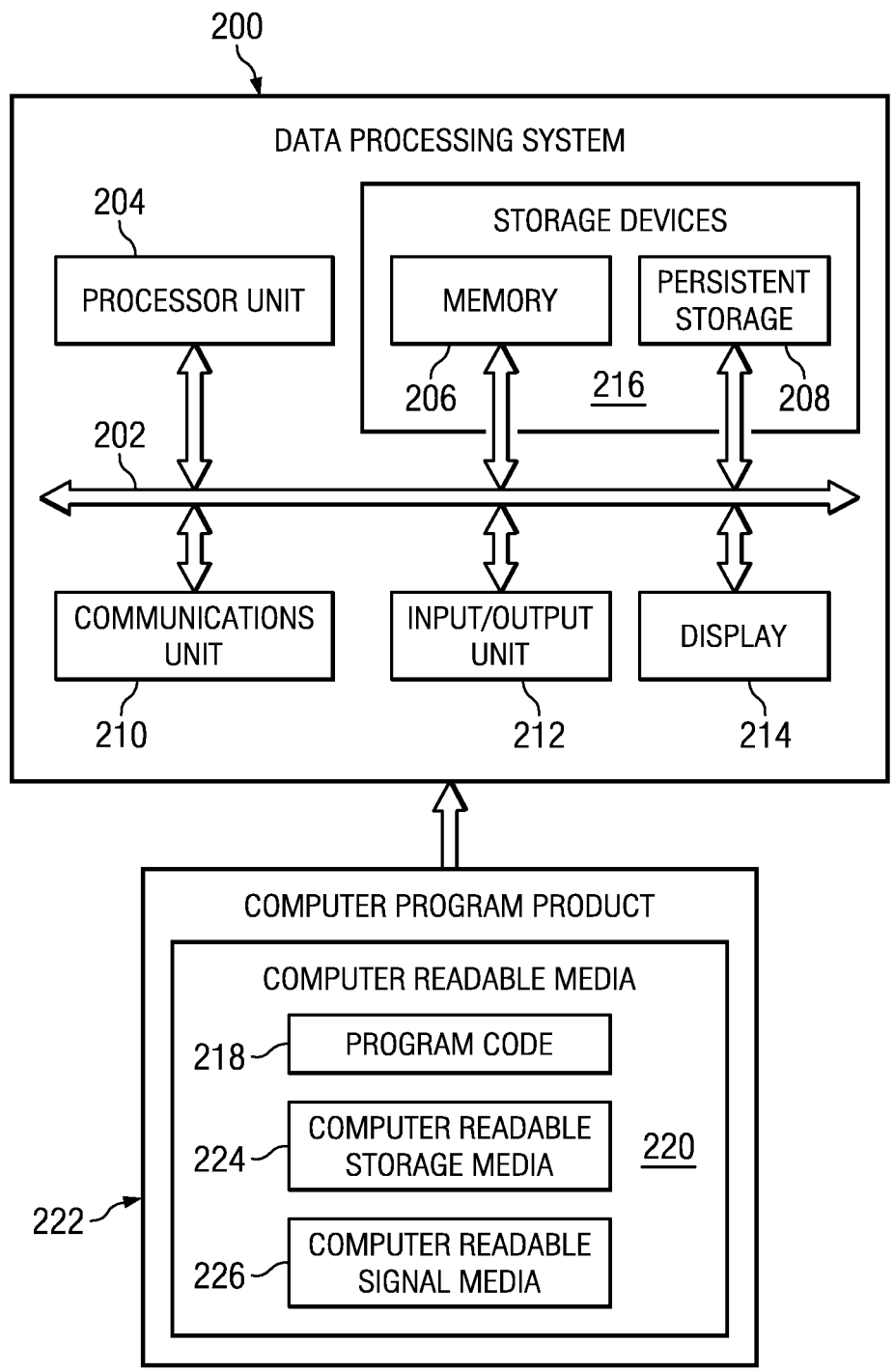
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
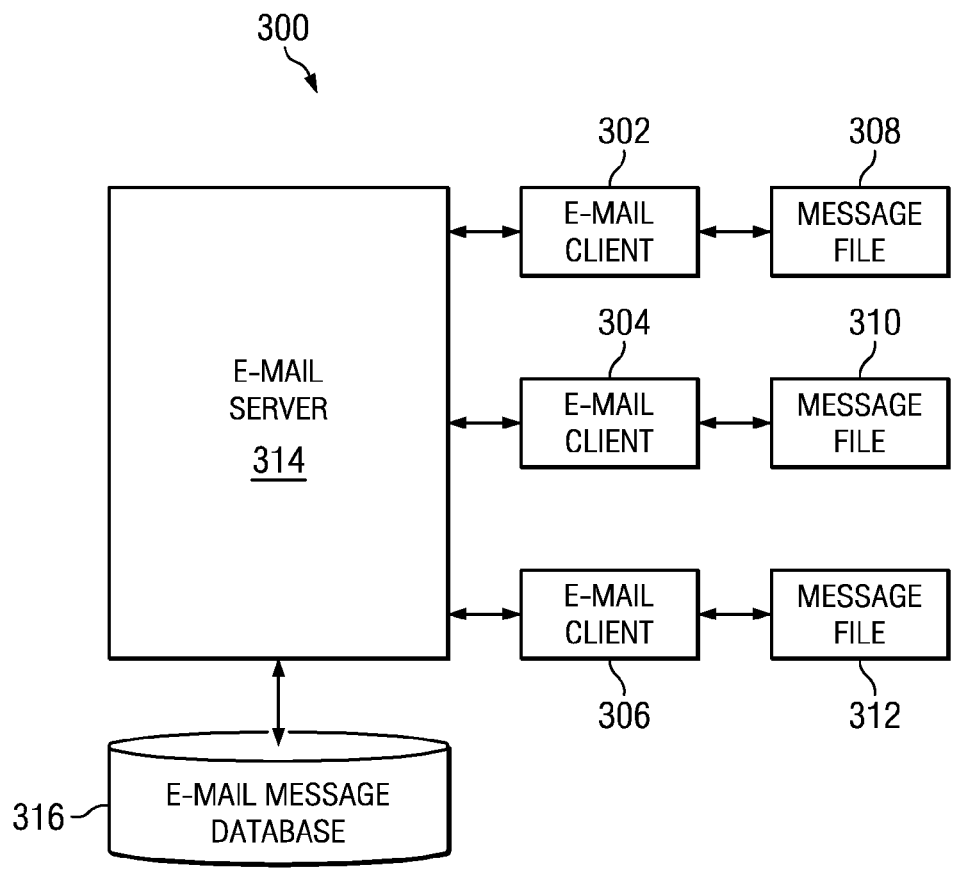
FIG. 3 is a block diagram of an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

Illustrative embodiments recognize that inattention to an e-mail account by a user for a period of time may result in the accumulation of a large number of unread e-mails for the user. For example, an extended absence from work due to a vacation or for another reason, or a lack of access to an e-mail account for a period of time for any reason, may result in the accumulation of hundreds or even thousands of unopened e-mail messages. When the user returns to work or otherwise becomes able to access his/her e-mail account, opening and reading each of the accumulated e-mail messages may place a significant burden on the user. Also, the large number of e-mail messages might result in a delay in reading time-sensitive e-mail messages that may have been received during the user's absence or may result in the user "skimming" through the accumulated e-mail messages and, perhaps, missing important e-mail messages that may have been received.

Therefore, the different illustrative embodiments provide a method, apparatus and computer program product for requesting e-mail messages, for example, unread e-mail messages, that may have accumulated over a period of time due to inattention by a user. According to an illustrative embodiment, download instructions for sending e-mail messages from an e-mail message database storing a plurality of e-mail messages to an e-mail client are received at an e-mail messaging system, and the e-mail messaging system sends e-mail messages from the e-mail message database to the e-mail client in accordance with the download instructions.

According to illustrative embodiments, the download instructions may include instructions that a specified number of the e-mail messages be sent to the e-mail client at a time, or instructions that e-mail messages from certain parties only be sent or that e-mail messages from certain parties not be sent. In addition, the download instructions may include a set of rules for prioritizing the downloading of at least some of the e-mail messages. For example, the set of rules may specify a category of e-mail messages to be sent first. Such category may, for example, include e-mail messages designated as being of high importance, e-mail messages with certain keywords in the subject line or e-mail messages sent by particular individuals.

According to further illustrative embodiments, the different categories of e-mail messages may themselves be prioritized, or a particular e-mail message that a user might be expecting can be designated to be sent first.

Figure 4:
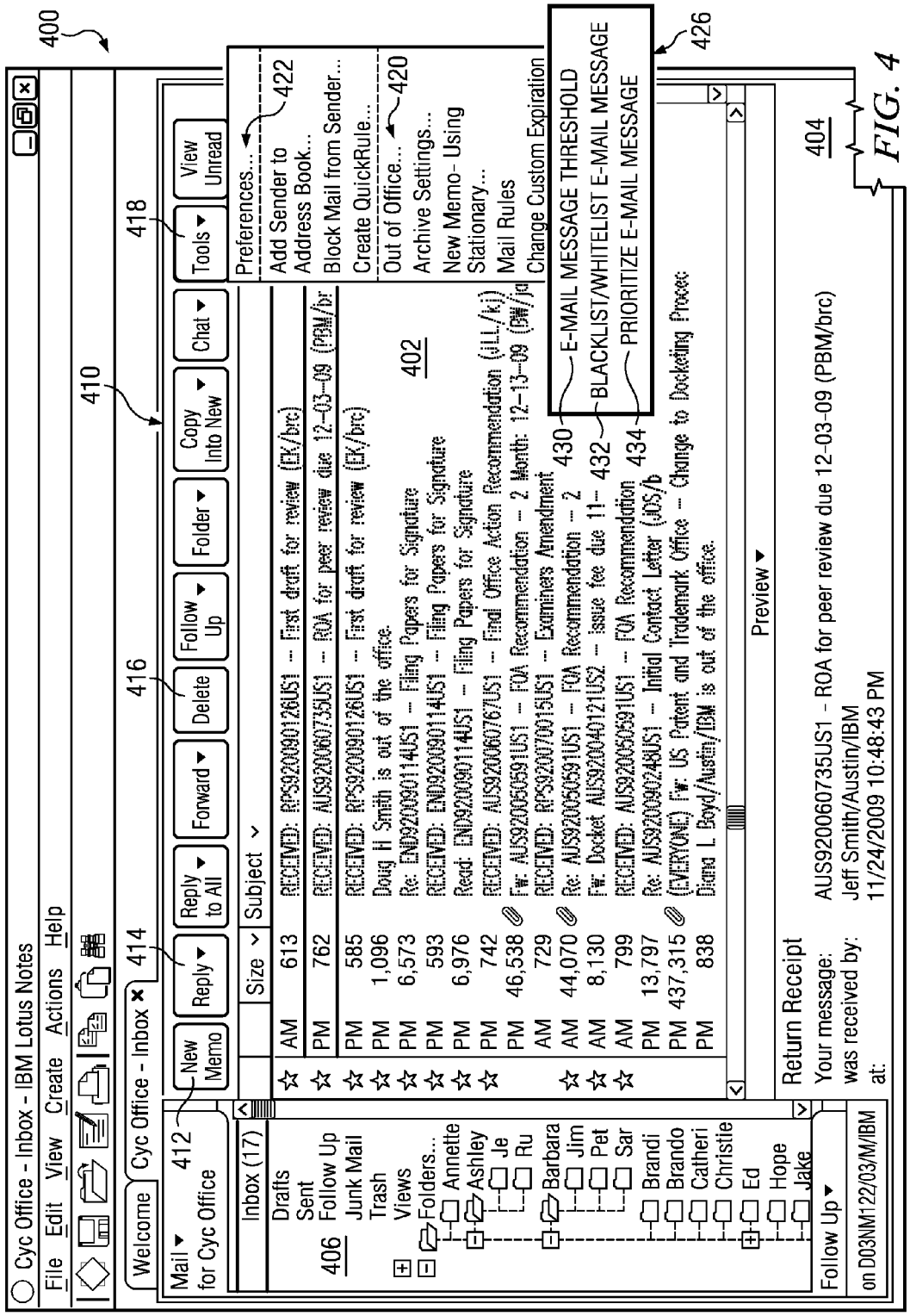
FIG. 4 is an illustration of a display of an e-mail messaging system in accordance with an illustrative embodiment.

With reference now to FIG. 4, an illustration of a display of an e-mail messaging system is depicted in accordance with an illustrative embodiment. The display is generally designated by reference number 400, and may be a display presented on the display screen of an e-mail user's computer, for example, on a display screen of one of clients 110, 112 or 114 in FIG. 1. As shown in FIG. 4, display 400 includes a first screen portion 402 that contains a listing of received e-mail messages, a second screen portion 404 that displays a selected one of the e-mail messages listed in first screen portion 402, and a third display portion 406 that lists categories of e-mail messages (mailboxes) that may be selected for listing in first screen portion 402. In FIG. 4, first screen portion 402 contains a listing of e-mail messages in a user's "Inbox." It should be understood, however, that display 400 is intended to be exemplary only as different e-mail messaging systems may provide different displays, and individual users may modify the display in numerous ways depending on preferences.

Display 400 may also include a plurality of action buttons, generally designated by reference number 410, which may be selected by a user, for example, by clicking on with a mouse, to perform various actions. As shown in FIG. 4, the action buttons may include, for example, "new memo" action button 412, "reply" action button 414, "delete" action button 416 and "tools" action button 418. Some of these action buttons may, when selected, result in a drop down menu being opened which lists additional actions which may be selected by the user. For example, as also shown in FIG. 4, selection of "tools" action button 418 opens a drop down menu 420.

One of the options listed on drop down menu 420 includes a "Preferences" option 422. "Preferences" option 422 may be selected by a user when the user has returned after being absent from work or was otherwise unavailable to access his or her e-mail account for a period of time, such that a large number of unread e-mail messages may have accumulated in his/her absence. As also shown in FIG. 4, by clicking on the "Preferences" option, a further drop down menu 426 may be opened specifying further options which may be selected by the user. As shown in FIG. 4, among the further options specified in drop down menu 426 includes an "e-mail message threshold" option 430, a "blacklist/whitelist e-mail messages" option 432, and a "prioritize e-mail messages" option 434.

Figure 5:
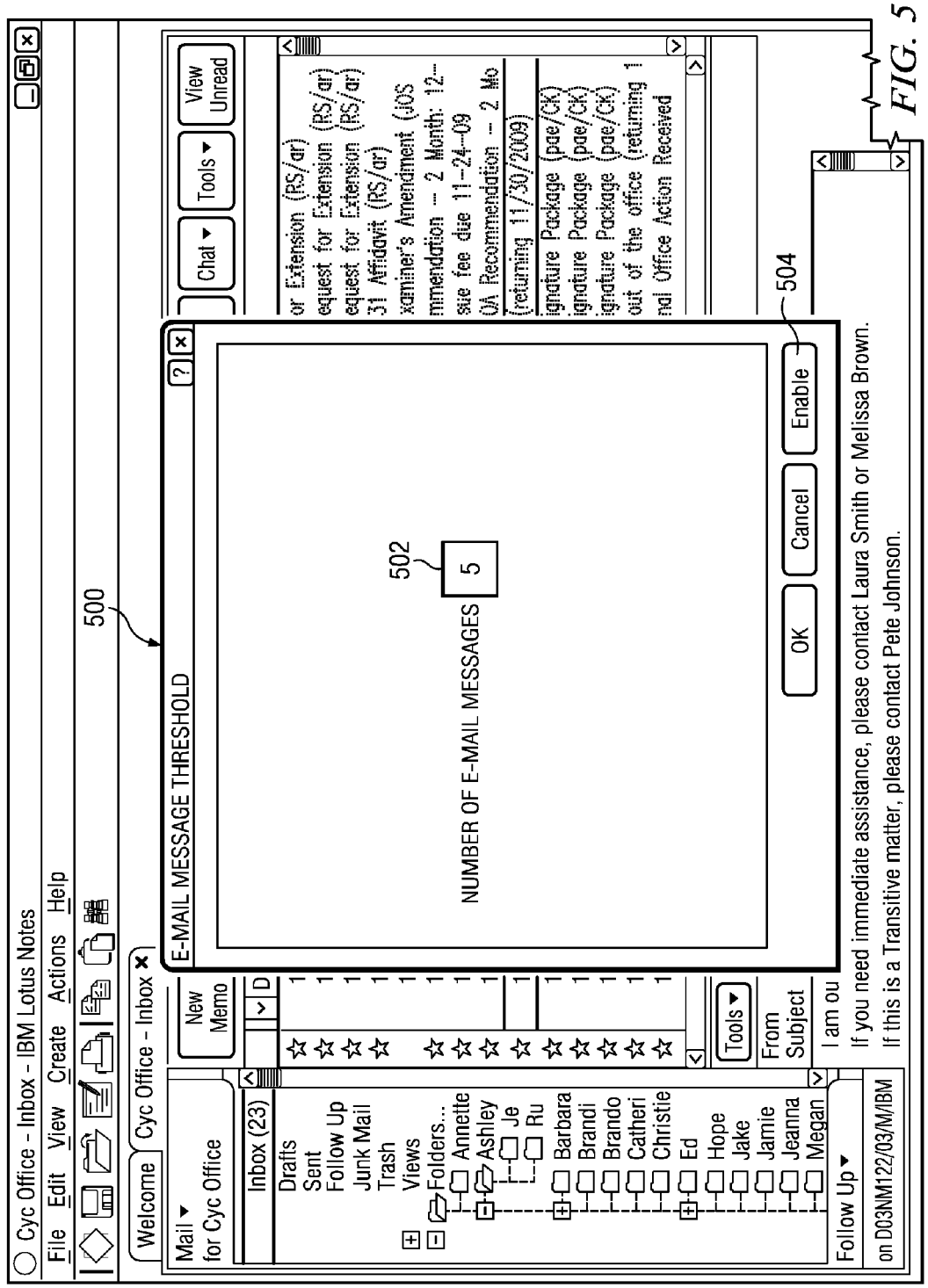
FIG. 5 is an illustration of an "e-mail message threshold" dialog box in accordance with an illustrative embodiment.

By selecting the "e-mail message threshold" option 430, a dialog box may appear as shown in FIG. 5. In particular, FIG. 5 is an illustration of an "e-mail message threshold" dialog box in accordance with an illustrative embodiment. The dialog box is generally designated by reference number 500, includes a box 502 for a user to indicate a number of e-mail messages that he/she would like to receive at a time. In FIG. 5, the user has designated five e-mail messages. It should be understood, however, that this is intended to be exemplary only, as the user may designate any desired number of e-mail messages to receive at a time. By filling in box 502 and then pressing enable button 504, e-mail messages will be sent to the e-mail client of the user five at a time, as requested.

Alternatively, the e-mail client may be provided with a set of pre-defined rules or user configurable rules to enable the e-mail client itself to determine how many e-mail messages to request at a time. For example, depending on connection speed/internet speed, the e-mail client could determine how many e-mails to request from the server at a time. Specifically, the e-mail client can test the connection and request a certain number of e-mails to receive at a time. This capability may be particularly useful when the user has only a limited connectivity, for example, when the user is using a smartphone over a cellular telephone service provider network, although it is not intended to limit the invention to any particular level of connectivity.

Figure 6:
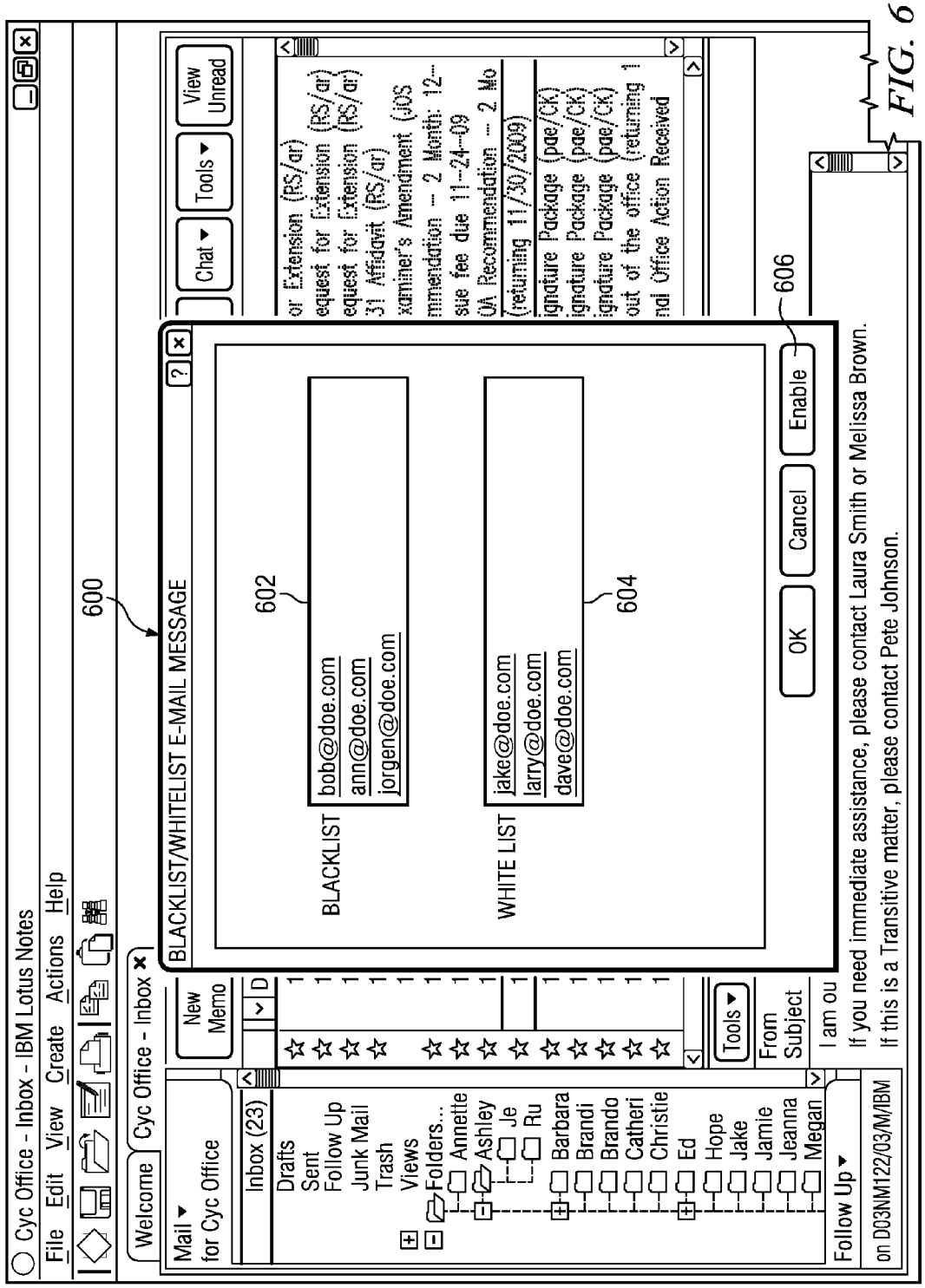
FIG. 6 is an illustration of a "blacklist/whitelist e-mail messages" dialog box in accordance with an illustrative embodiment.

By selecting the "blacklist/whitelist e-mail messages" option 432, a further dialog box may appear in which the user may specify parties that the user does not want to receive e-mail messages from during the period that the accumulated e-mails are being downloaded, and/or parties from whom the user wants to receive e-mail messages from during the period. FIG. 6 is an illustration of a "blacklist/whitelist e-mail messages" dialog box in accordance with an illustrative embodiment. The dialog box is generally designated by reference number 600, and includes a box 602 for a user to list parties to be blacklisted and a box 604 for a user to list parties to be whitelisted. FIG. 6 illustrates that three parties have been blacklisted such that e-mail messages from those parties that were received during the user's absence and that are stored in the e-mail message database will not be sent to the e-mail client, and that three parties have been whitelisted such that e-mail messages from those parties will be sent to the e-mail client. By the user designating the party(s) to be blacklisted and/or whitelisted, and then pressing the enable button 606, the server computer of the e-mail messaging system will not download blacklisted e-mail messages and will download whitelisted e-mail messages to the e-mail client during the period that the accumulated e-mail messages are being processed.

Although FIG. 6 illustrates a single dialog box 600 for identifying blacklisted and whitelisted e-mail messages, it should be understood that separate dialog boxes could be provided for these functions, if desired. Also, it should be understood that the blacklist/whitelist selections may be made independent of or in addition to the threshold selection illustrated in FIG. 5.

By selecting the "prioritize e-mail messages" option 434 illustrated in FIG. 4, a further dialog box may appear as shown in FIG. 7. In particular, FIG. 7 is an illustration of a "prioritize e-mail messages" dialog box in accordance with an illustrative embodiment. The dialog box is generally designated by reference number 700, and may include several options that may be selected by the user to specify the manner in which accumulated e-mail messages are to be prioritized for downloading to the e-mail client. This option may be particularly useful when there is limited connectivity, however, it should be understood that it is not intended to so limit the invention. For example, if a user wishes to be more focused during the work day, he/she may wish to download only a limited number of messages notwithstanding having full connectivity.

As shown in FIG. 7, a first option in dialog box 700 may be a "historical" option 702. By selecting historical option 702, the e-mail messaging system may automatically download e-mail messages based on historical usage patterns of the user. For example, by selecting historical option 702, e-mail messages may be sent to the user's e-mail client based on a previously selected prioritization preference of the user or based on other historical factors.

The user may also select other options provided in dialog box 700. For example, option 704 is a "first come, first serve" option by which the user may specify that e-mail messages be sent to the e-mail client in the order that they were received by the e-mail messaging system. Option 706 is an organization structure option by which the user may specify that e-mail messages from particular members of an organization be sent first. For example, the user may specify that e-mail messages from individuals who are "higher up" than the user in a company be sent first. These individuals can be identified by the e-mail messaging system, for example, by using LDAP (Lightweight Directory Access Protocol). Yet other criteria for prioritizing e-mail messages from an organization can also be specified using this option.

Another option that may be selected by the user in dialog box 700 is "priority of message" option 708. By selecting this option, e-mail messages designated as being of high importance may be downloaded first. Also, as shown at block 710, an option that comprises some combination of other options may be selected or an "other" option box 714 may be selected. The "other" option box may be used, for example, to designate a particular e-mail that the user is expecting or that e-mails from a particular sender are to be sent first. Other options may include e-mail messages with certain key words in the in the subject line, or e-mail messages addressed to the user only, or numerous other options depending on the user preferences.

In general, the various options for prioritizing the accumulated e-mails that are described herein are intended to be exemplary only as many other options can be provided to the user. For example, a user may wish to prioritize the parties listed in the whitelist box 604 in FIG. 6 so as to receive e-mail messages from certain of the whitelisted parties before others of the whitelisted parties. This option may be especially useful for very low connectivity. In general, however, illustrative embodiments provide a mechanism that enables a user to handle a large number of accumulated e-mail messages in a manner that is convenient and useful to the user.

Figure 8:
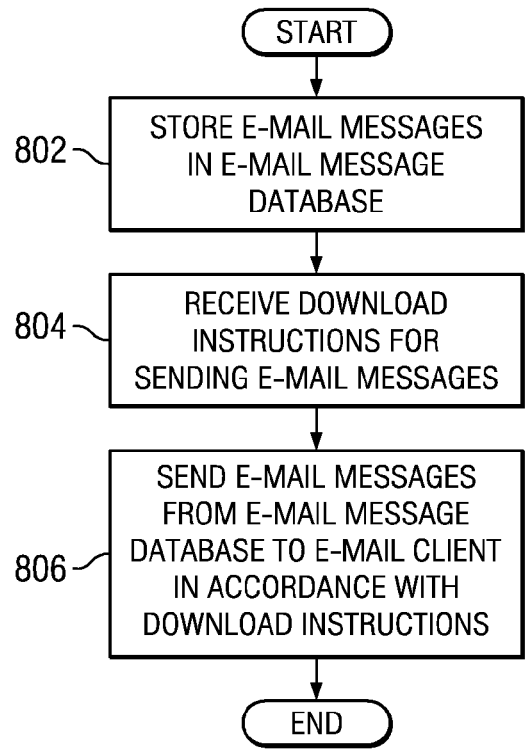
FIG. 8 is a flowchart that illustrates a method for receiving e-mail messages in accordance with an illustrative embodiment.

FIG. 8 is an illustration of a flowchart of a method for receiving e-mail messages in accordance with an illustrative embodiment. The method is generally designated by reference number 800, and begins by an e-mail messaging system storing e-mail messages received for a user in an e-mail message database (Step 802). In accordance with an illustrative embodiment, for example, the e-mail messages are accumulated during a period when the user is absent from work due to a vacation or for another reason, or when the user is unable to access to an e-mail account for a period of time for any reason. Download instructions for sending e-mail messages from the e-mail message database to an e-mail client are received (Step 804). The download instructions may be received by user input when the user returns from his/her absence, or the instructions may be automatically sent by the e-mail client or both. The e-mail messages are then from the e-mail message database to the e-mail client in accordance with the download instructions (Step 806), and the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for requesting e-mail messages, comprising:
   receiving, by an e-mail messaging system, download instructions for sending e-mail messages from an e-mail message database storing a plurality of e-mail messages to an e-mail client; and
   the e-mail messaging system sending e-mail messages from the e-mail message database to the e-mail client in accordance with the download instructions, wherein the download instructions specify a priority order in which the e-mail messages are to be sent from the e-mail message database to the e-mail client, wherein the download instructions further specify a number of the e-mail messages to be sent to the e-mail client at a time.

2. A computer program product in a computer usable storage device for requesting e-mail messages, the computer program product having computer usable program code for:
   receiving, by an e-mail messaging system, download instructions for sending e-mail messages from an e-mail message database storing a plurality of e-mail messages to an e-mail client; and
   the e-mail messaging system sending e-mail messages from the e-mail message database to the e-mail client in accordance with the download instructions, wherein the download instructions specify a priority order in which the e-mail messages are to be sent from the e-mail message database to the e-mail client, wherein the download instructions further specify a number of the e-mail messages to be sent to the e-mail client at a time.

* * * * *